United States Patent
McMillen et al.

(10) Patent No.: US 7,172,248 B2
(45) Date of Patent: Feb. 6, 2007

(54) SLIDER CLIP SUPPORT

(75) Inventors: Robert J. McMillen, Tecumseh (CA); Renato Colja, Windsor (CA); Asad Sami, LaSalle (CA); Bogdan Rencz, Windsor (CA); George Kukuruzovic, Windsor (CA)

(73) Assignee: Schukra of Norht America Ltd., Tecumseh (CA)

( * ) Notice: Subject to any disclaimer, the term of this patent is extended or adjusted under 35 U.S.C. 154(b) by 0 days.

(21) Appl. No.: 11/155,382

(22) Filed: Jun. 17, 2005

(65) Prior Publication Data
US 2006/0138831 A1   Jun. 29, 2006

Related U.S. Application Data

(60) Provisional application No. 60/631,459, filed on Nov. 29, 2004.

(51) Int. Cl.
*A47C 3/00* (2006.01)
(52) U.S. Cl. .................................. 297/284.9
(58) Field of Classification Search ............. 297/284.9, 297/284.1
See application file for complete search history.

(56) References Cited

U.S. PATENT DOCUMENTS

| | | | |
|---|---|---|---|
| 1,527,754 A * | 2/1925 | Simon | 601/24 |
| 3,241,879 A | 3/1966 | Castello et al. | |
| 4,182,533 A | 1/1980 | Arndt et al. | |
| 4,339,150 A | 7/1982 | McNamara et al. | |
| 4,636,000 A | 1/1987 | Nishino | |
| 4,647,066 A * | 3/1987 | Walton | 297/284.1 |
| 5,240,308 A | 8/1993 | Goldstein et al. | |
| 5,397,164 A | 3/1995 | Schuster et al. | |
| 5,681,084 A * | 10/1997 | Yoneda | 297/284.9 |
| 5,697,672 A | 12/1997 | Mitchell | |

(Continued)

FOREIGN PATENT DOCUMENTS

DE        199 20 216 A1   11/2000

(Continued)

OTHER PUBLICATIONS

Apr. 11, 2006 International Search Report and The Written Opinion of the International Searching Authority, or the Delcaration.

*Primary Examiner*—Milton Nelson, Jr.
(74) *Attorney, Agent, or Firm*—Husch & Eppenberger LLC; Grant D. Kang; Dennis J. M. Donahue, III

(57) ABSTRACT

An ergonomic support system for a seat has a resilient seat suspension platform with a pair of side margins and a plurality of transverse wires. Ergonomic supports are mounted on the seat adjacent to and/or within the side margins. A bracket has a slot extends along the bracket. One end of a support arm is attached to the ergonomic support and the other end connects the ergonomic support to the bracket through a slide clip. The slide clip is seated in the slot and provides a sliding engagement between the support arm and the bracket. A mounting clip engages the support arm at a region intermediate between the ends of the support arm. A spring can be operatively connected between the bracket end and the ergonomic support, and a hinge arm may also connect the ergonomic support to the bracket through the mounting clip.

26 Claims, 6 Drawing Sheets

U.S. PATENT DOCUMENTS

| | | |
|---|---|---|
| 5,913,569 A | 6/1999 | Klingler |
| 6,045,185 A | 4/2000 | Ligon, Sr. et al. |
| 6,068,336 A | 5/2000 | Schonauer |
| 6,257,664 B1 * | 7/2001 | Chew et al. .............. 297/284.9 |
| 6,460,933 B1 * | 10/2002 | Bors et al. ................ 297/440.2 |
| 6,652,029 B2 | 11/2003 | McMillen |
| 2004/0108760 A1 | 6/2004 | McMillen |
| 2004/0140705 A1 | 7/2004 | McMillen et al. |

FOREIGN PATENT DOCUMENTS

| | | |
|---|---|---|
| DE | 101 35 122 C1 | 12/2002 |
| DE | 102 19 015 A1 | 11/2003 |
| GB | 2 013 487 A | 8/1979 |
| WO | WO 2005/108157 | 11/2005 |

* cited by examiner

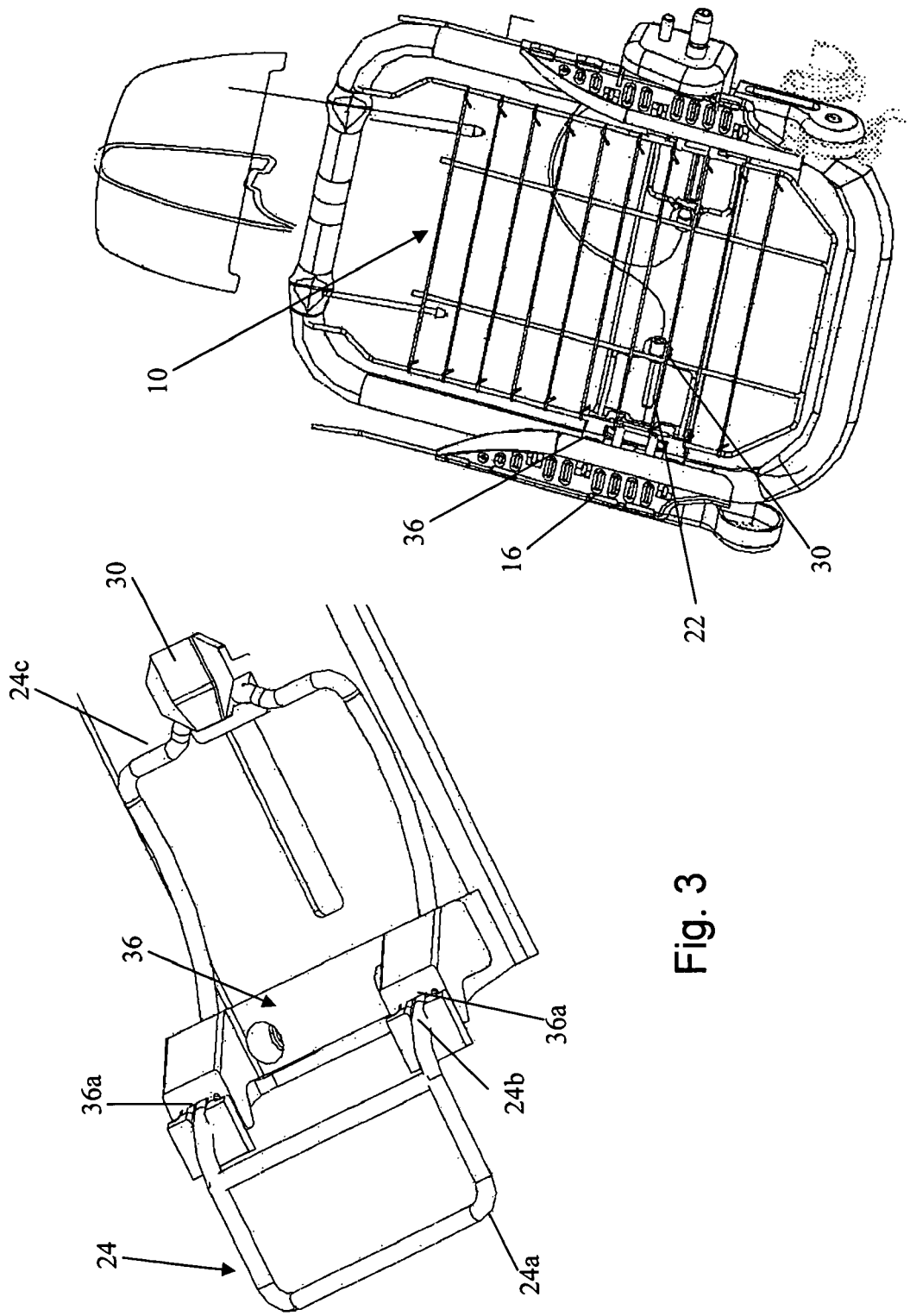

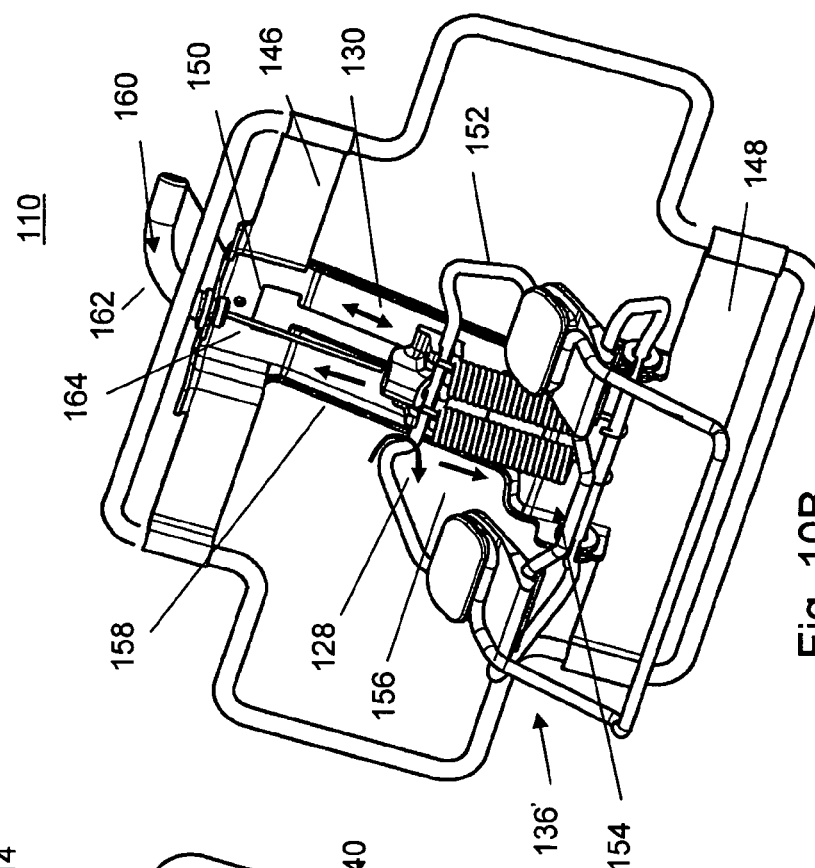
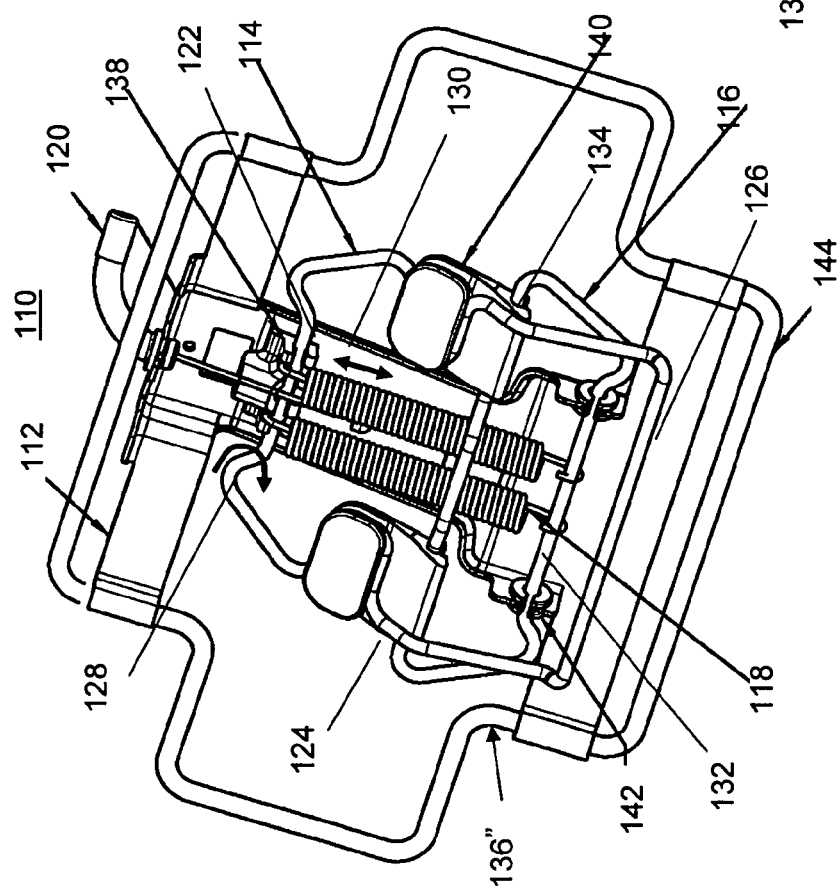

SLIDER CLIP SUPPORT

CROSS-REFERENCE TO RELATED APPLICATIONS

This application claims the benefit of U.S. Provisional Application No. 60/631,459, filed on Nov. 29, 2004, which is incorporated by reference herein.

BACKGROUND OF THE INVENTION

1. Field of the Invention

This invention relates generally to ergonomic support systems, and more particularly, to adjustable supports for seats.

2. Related Art

There are a number of seat support systems which use an actuator system to extend and/or retract a pair of arms that are rotatably interconnected with each other and which are supported in the seat by a mounting structure. For example, different types of such support systems are described in the following references: U.S. Pat. No. 4,182,533, U.S. Pat. No. 5,240,308, U.S. Pat. No. 5,697,672, U.S. Pat. No. 5,913,569, U.S. Pub. No. 2004/0108760 and U.S. Ser. No. 10/654,496.

There are also a number of seat support systems that can be folded to increase the space available for cargo. To maximize the cargo space and utility of the cargo space, it is advantageous for the seats to fold as flat as possible. For example, US Patent Application Pub. No. 2004/0140705 reduces the depth of the seat back and/or seat base when the seat is folded, allowing the seat to fold more flatly, thereby increasing the available cargo space and enhancing utility of the cargo area There is also a continuing need in the industry to simplify manufacturing efforts, such as increasing the commonality of parts between different types of ergonomic support systems and reducing the number of fasteners, parts and assembly operations.

SUMMARY OF THE INVENTION

It is in view of the above problems that the present invention was developed. The present invention is an actuating ergonomic support system for a seat that increases the commonality of parts and reducing the number of fasteners, parts and assembly operations. The same parts that are used for bolster supports may also be used for lumbar supports and even head restraint systems. Similarly, the same devices can be used for support systems that are manually actuated, motor driven, or even automatically extended by folding and unfolding the seat, such as described in US Patent Application Pub. No. 2004/0140705.

A seat frame has a resilient seat suspension platform comprising a pair of side margins and a plurality of vertical and horizontal support wires. The seat frame may be a seat back frame or a seat bottom frame. Ergonomic supports are mounted on the seat back frame and/or the seat bottom frame. The ergonomic supports can be adjacent to each side margin of the suspension platform, as with bolsters and a head restraint, or within the side margins, as with a lumbar. Each ergonomic support has a retracted position and an extended position. A bracket extends between the pair of side margins. The bracket has a pair of slots, and slide clip is seated in each slot and provides a means for sliding engagement. A support arm connects each ergonomic support to the bracket. The support arm has a first end and a second end. The first end is attached to the ergonomic support and the second end is attached to the slider clip.

The ergonomic supports are actuated to move between their retracted and extended positions, preferably using traction cables commonly known as Bowden cables. The traction cable has a sleeve and a wire disposed to slide axially through the sleeve. A first sleeve end and a first wire end are engaged with the slider clip. A second sleeve end is engaged with a known tensioning means, which may include a motor, a hand wheel or other rotational tensioning mechanisms. Application of tension to the Bowden cables causes the slider clips to slide within their respective bracket slots. The sliding movement of slider clip causes movement of the support arm. The sinuous shape of the support arm causes the ergonomic support to be drawn inward and downward moving from the extended position to the retracted position. Conversely, when tension on the traction cables is released, the slider clips slide in an opposite direction and the support arm is pushed outward and upward, moving the ergonomic support from the retracted position to the extended position.

In one embodiment, the seat support system is provided with a pair of guide clip having a channel for receive a support arm. The guide clips are attached at each end of the bracket. The support arm is inserted through the channel of the guide clip. The guide clip supports the support arm and guides the movement of the support arm in the manner described above.

In another embodiment, the seat support system is provided with a pair of hinge arms. The hinge arms have a first end pivotally connected the ergonomic support. The first end of the hinge arm may be either directly connected to the ergonomic support or connected indirectly by pivotal attachment to the support arm. A second pair of slider clips is provided. Each one of the second pair of slider clips is seated in one of the pair of bracket slots. The second end of the hinge arm is attached to the second slider clip. In this embodiment, the traction cable connects to and joins the pair of clips seated in a slot, such that the pair of slider clips slide in tandem within the slot. In the extended position, the hinge arm is substantially perpendicular to the ergonomic support. Actuation of the traction cable causes the pair of slider clips to tandemly slide in direction within the guide, causing the hinge arms pivot in relation to the ergonomic support as the ergonomic support moves between the extended position and retracted position in the manner described above.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings:

FIG. 3 illustrates a detailed view of a clip according to the present invention.

FIG. 4 illustrates a view of the present invention as installed in a seat frame.

FIGS. 10A and 10B illustrate a lumbar support embodiment of the present invention in retracted and extended positions, respectively.

DETAILED DESCRIPTION OF THE PREFERRED EMBODIMENTS

Figure 2:
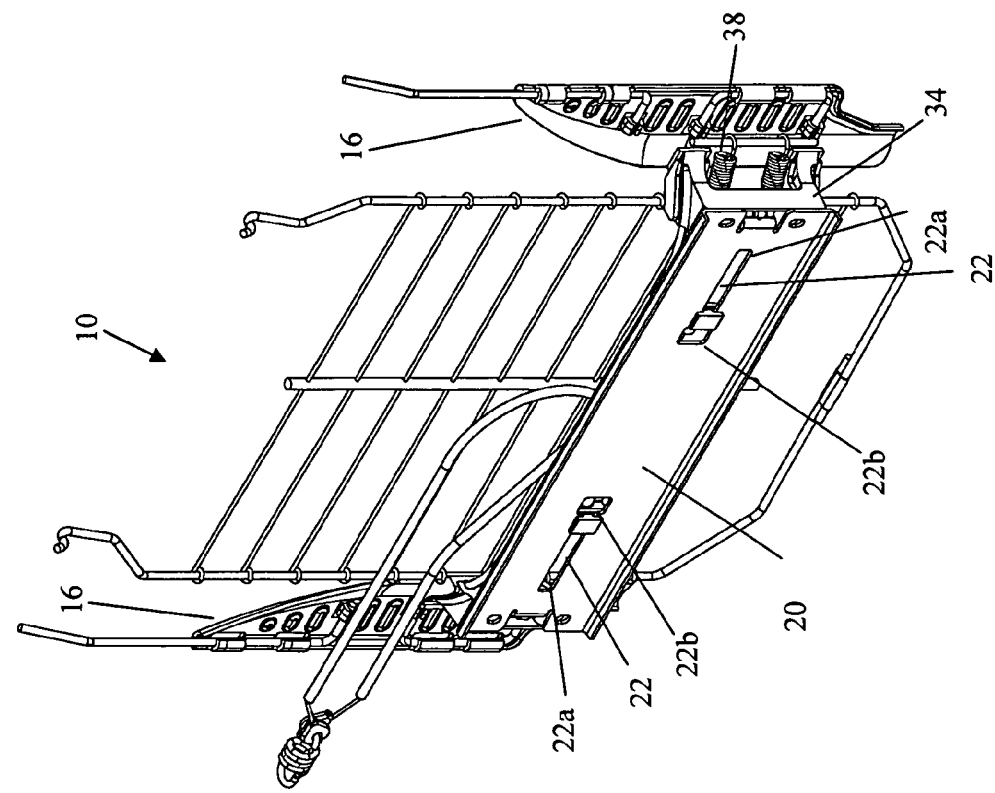
FIGS. 1 and 2 respectively illustrate isometric front and rear views of the present invention.
Figure 1:
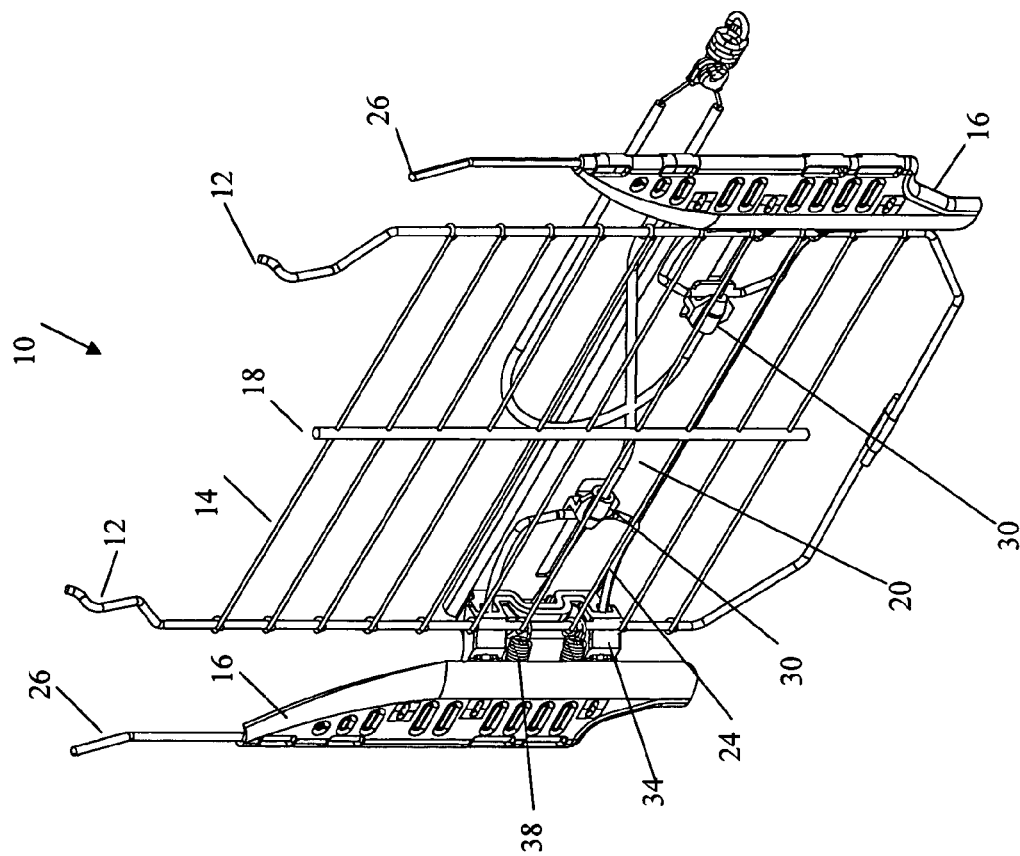

Referring to the accompanying drawings in which like reference numbers indicate like elements, FIGS. 1 and 2 illustrate perspective front and rear views of the actuating ergonomic support system (10), in which the ergonomic supports may be moved between the extended and retracted positions by sliding engagement with a stationery bracket. The actuating ergonomic support system (10) preferably comprises a pair of side margins (12) between which extend a plurality of transverse wires (14) that are attached to the side margins. The transverse wires may extend through a longitudinal element (18) substantially parallel to and between the side margins. A pair of ergonomic supports (16), such as the bolsters particularly shown in the illustrations, is positioned adjacent to the side margins. The ergonomic supports (16) are connected to the seat frame by known attachment means (26), preferably flexible means such as cables or wires that permit movement of the ergonomic support.

A bracket mount (20) is positioned in a plane behind the transverse wires and ergonomic supports and extends between the side margins (12) or the ergonomic supports (16). The bracket preferably includes at least one slot (22), and the pair of ergonomic supports are connected to the bracket by a pair of support arms (24) having a first end (24a), a coupling section (24b) and a second end (24c). The first end of the support arm (24a) is connected to the ergonomic support (16) and the second end of the support arm (24c) engages the bracket (20) through a slide clip (30) that is seated in the slot (22). The coupling section (24b) engages a mounting clip (34) which is fixed to the bracket (20). The slide clip (30) and slot (22) exemplify one type of track slide system that can be used to slidingly connect the support arm (24) to the bracket mount (20). Generally, the slide clip (30) serves as the slide element and the slot (22) serves as the runner element in a runner slide system as discussed in more detail below with reference to FIGS. 10A and 10B.

As particularly shown in FIG. 3, the actuating ergonomic support system is provided with a pair of mounting clips (34) fixed to the bracket (20). Generally, the mounting clips (34) secure the coupling portion (24b) of said support arm (24) relative to the mount (20) and permit the ends (24a, 24c) to rotate relative to the coupling portion as the slide clip (30) moves between the ends (22a, 22b) of the slots (22). Accordingly, the coupling portion (24b) is intermediate between the support arm's ends (24a, 24c). Preferably, the mounting clip (34) is secured to the coupling portion (24b) of the support arm at a position approximately equidistant between the support arm's ends (24a, 24c). In this embodiment, a guide clip (36) serves as the mounting clip (34). The guide clip (36) has a channel (36a) for receiving the arcuate support arm (24), and the coupling section (24b) of the support arm is seated in the channels of the guide clip (36a). Movement of the slide clips, as described above, causes the support arms (24) to slide and rotate relative to the channels (36a) thereby rotating the ergonomic support between the extended and retracted positions. A spring (38) can be situated between the ergonomic support (16) and the side margin (12). The spring (38) preferably biases the ergonomic support in the extended position, and tension on the Bowden cable is increased to retract the support arms. As particularly illustrated, preferably a coil spring forces the ergonomic support from a retracted position to an extended position. It will be appreciated that other types of springs, such as a torsional or spiral spring, could also be used without departing from the scope of the present invention.

As shown in FIG. 4, the support system can be installed in the back of a seat frame. In a first, extended position, the ergonomic supports (16) are positioned slightly forward of the side margins (12). Actuation of the slide clips (30) causes the clips to slide within the slot (22). The support arm (24) is arcuate in shape such that sliding movement of the slide clips (30) toward the center of the bracket causes the support arms (24) and the attached ergonomic supports (16) to be pulled inward and downward relative to the side margins (12) resulting in the substantially flat, retracted position shown in FIG. 2. Conversely, actuation of the slide clips to move from the center toward the ends (22a, 22b) of the slot (22) causes the support arms and attached ergonomic supports to be pushed outward and forward relative to the side margins. It will be appreciated that according to the present invention, a variety of actuation means may be provided to move the slide clips. Accordingly, operation of the Bowden cables (40) or other tensioning devices may be manual or motorized, and may use means similar to that described in US Patent Application Pub. No. 2004/0140705 in which the actuation means uses the folding of the seat to vary the tension in Bowden cables.

Figure 6:
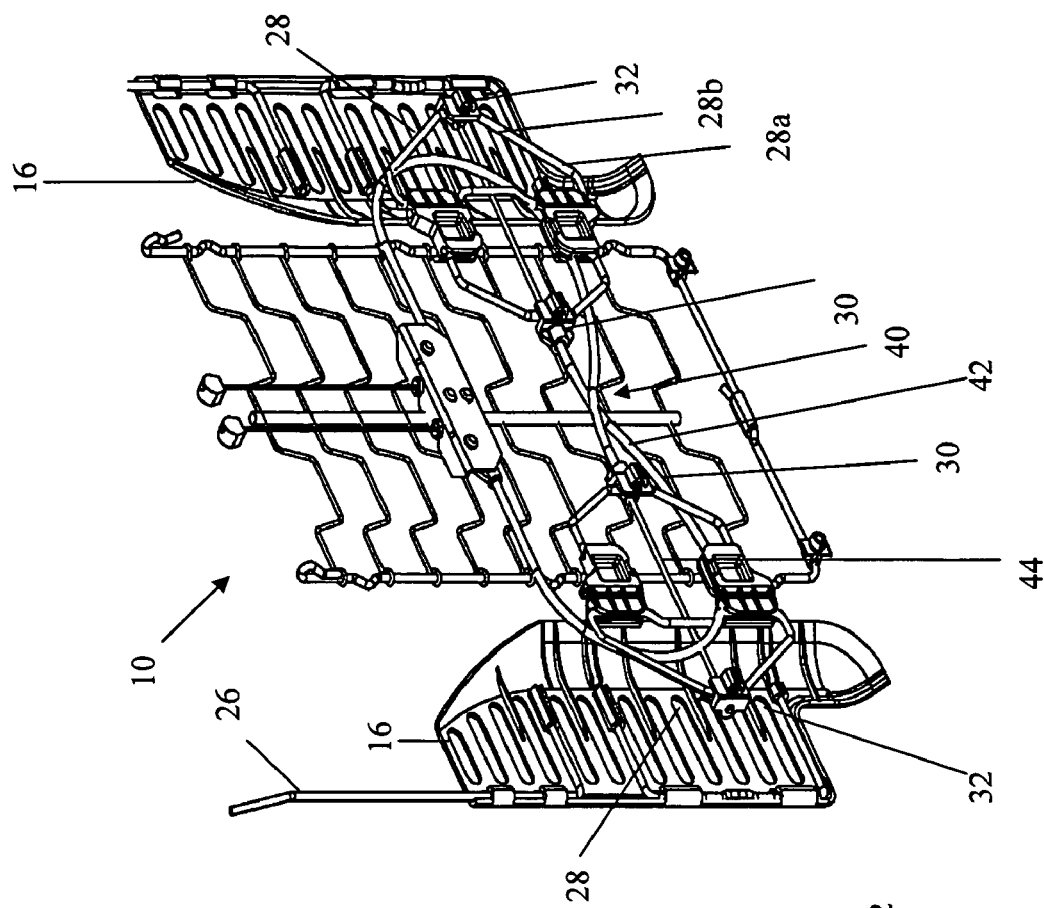
FIGS. 5 and 6 respectively illustrate isometric front and rear views of an alternative embodiment of the present invention.
Figure 5:
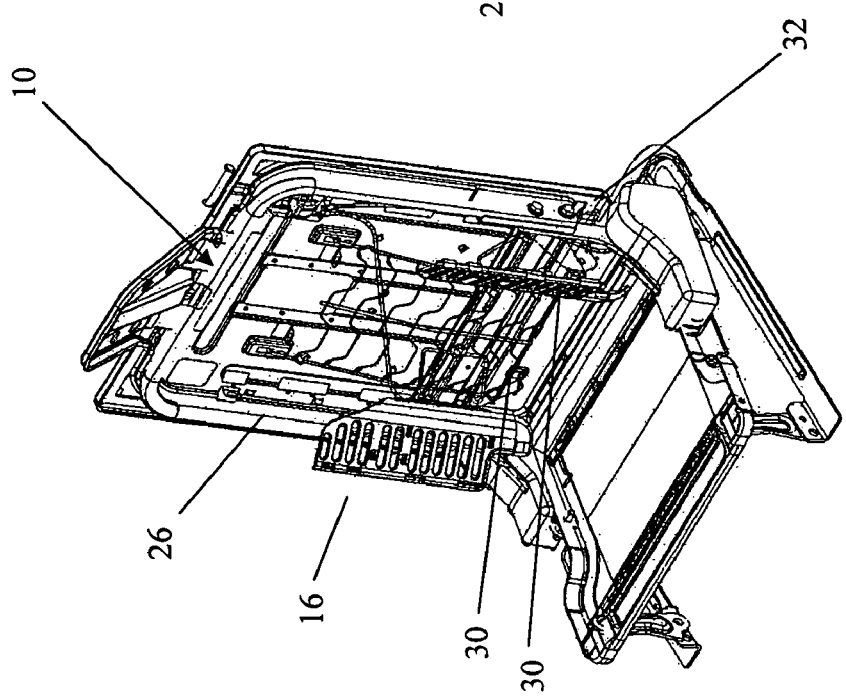
Figure 6A:
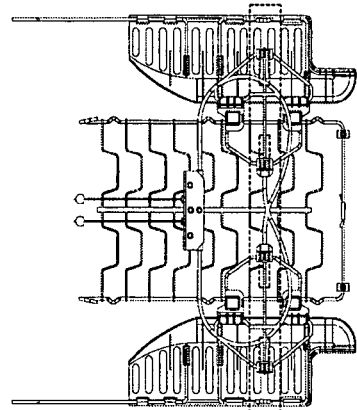

In yet another embodiment, as shown in FIGS. 5 and 6, the ergonomic support system is provided with a second pair of slide clips (32) in addition to the first pair of slide clips (30). As discussed in detail above, the first end of each support arm (24) is respectively connected to the first end of each of the first slide clip pair (30). In this embodiment, the bracket mount (20) is formed into the back panel of the seat, and each one of the second pair of slide clips is seated, respectively, in one of the pair of slots (22). Each slot (22) preferably seats the first and second pair of slide clips (30, 32). In this embodiment, the mounting clip is integrally formed with the coupling portion of the support arm (24). In particular, the support arm is constructed from a wire formation and the coupling portion is integrally formed with the mounting clip as bends in the wire, preferably a loop.

As particularly shown in FIG. 6, the Bowden cable sleeve end (42) is attached to the first slide clip (30) and the Bowden cable wire end (44) extends from the first slide clip (30) to the second slide clip (32), connecting the two slide clips. A hinge arm (28) has a first end (28a) and a second end (28b). The first end of the hinge arm is in pivotal relationship to the ergonomic support. The first end of the hinge arm (28a) may be pivotally attached directly to the ergonomic support (16) or indirectly by pivotal attachment to the support arm (24). The second end of the hinge arm (28b) is connected to one of the second pair of slide clips (32). In the extended position, the hinge arm is substantially perpendicular to the ergonomic support. Actuation of Bowden cable (40) causes the pair of slide clips (30, 32) within a slot

(22) to slide in tandem in a direction, causing the hinge arm (28) to pivot and rotate the ergonomic support (16) between the extended position and the retracted position in the manner described above.

Figure 8:
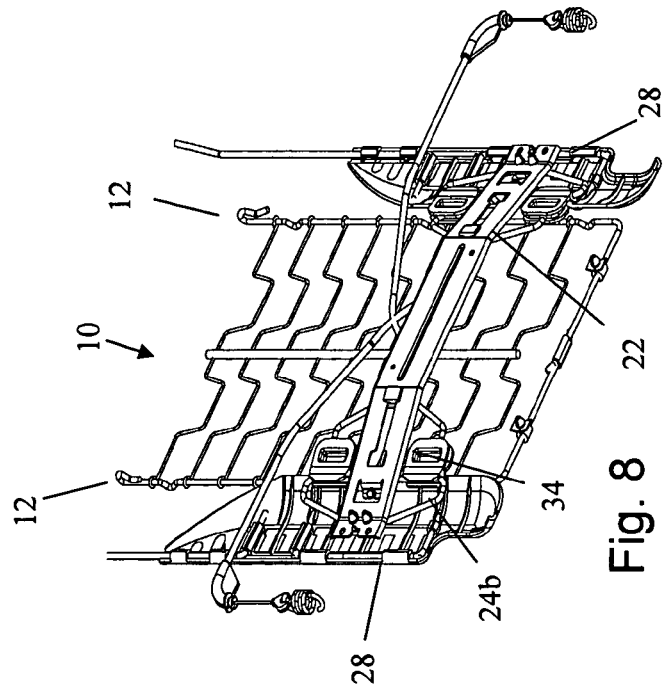
FIGS. 7 and 8 respectively illustrate isometric front and rear views of another embodiment according to the present invention.
Figure 7:
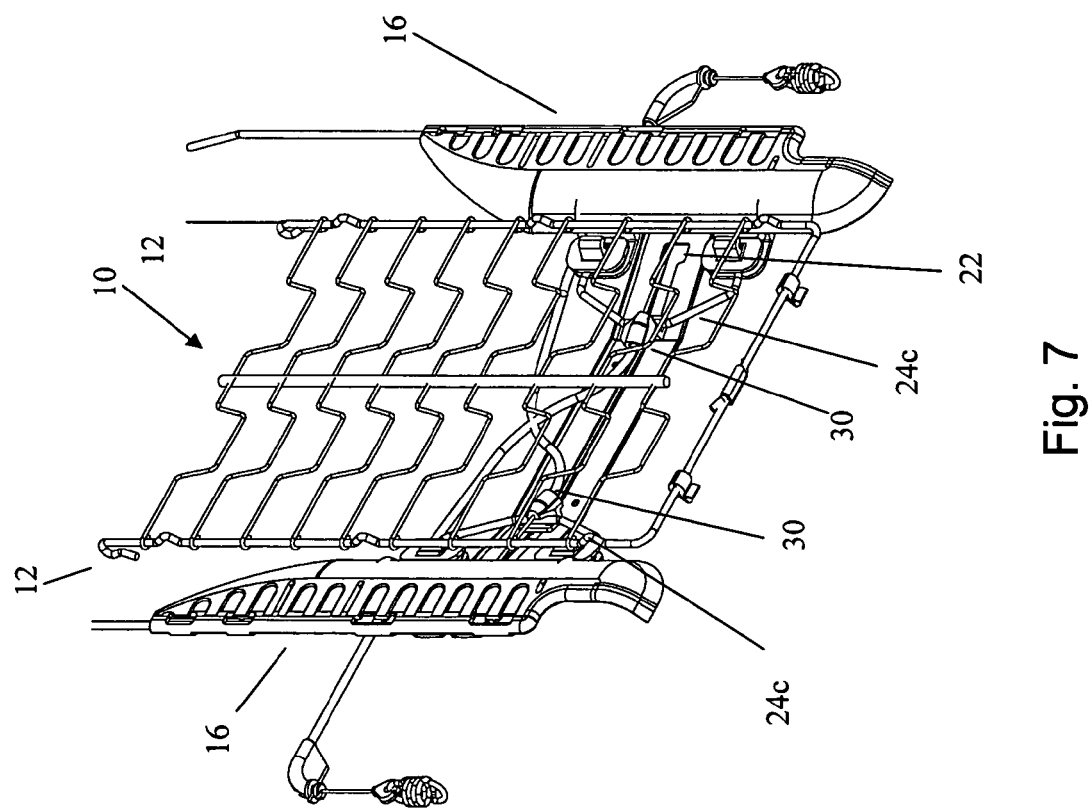
Figure 9B:
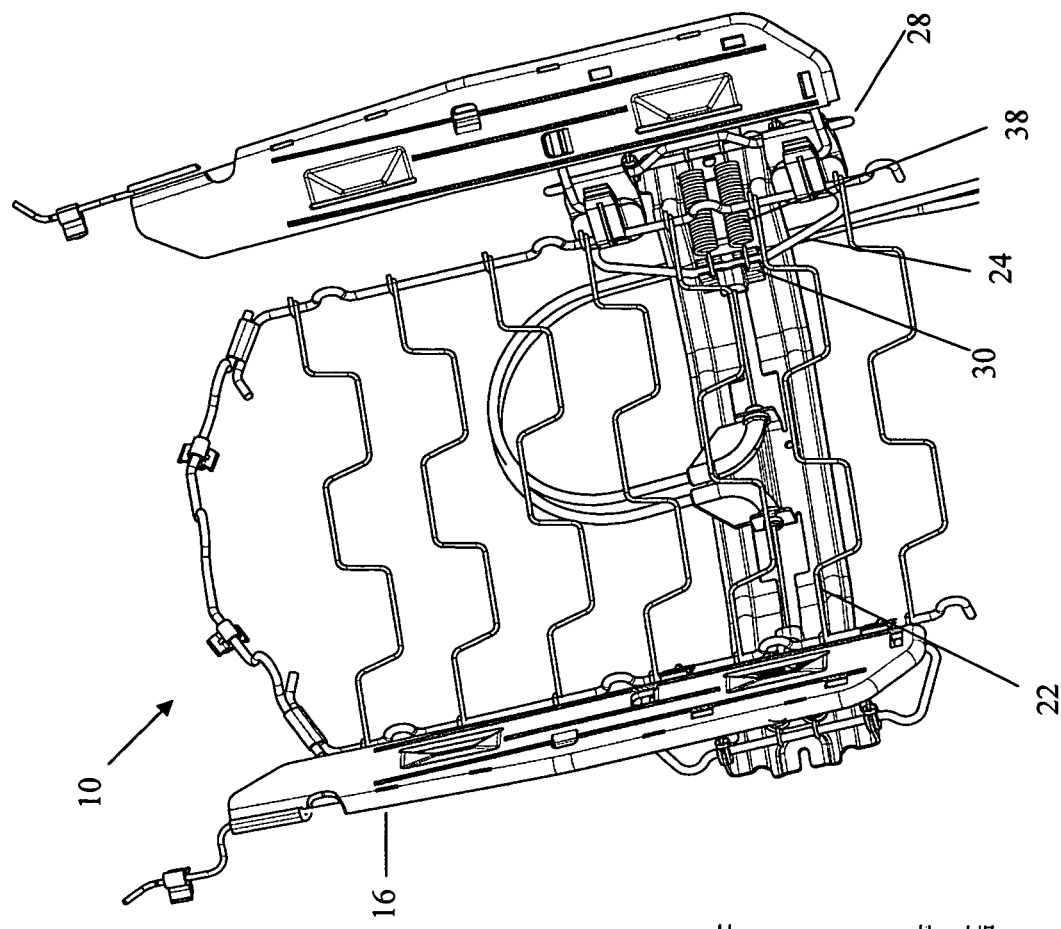
FIGS. 9A and 9B respectively illustrate yet another embodiment of the present invention.
Figure 9A:
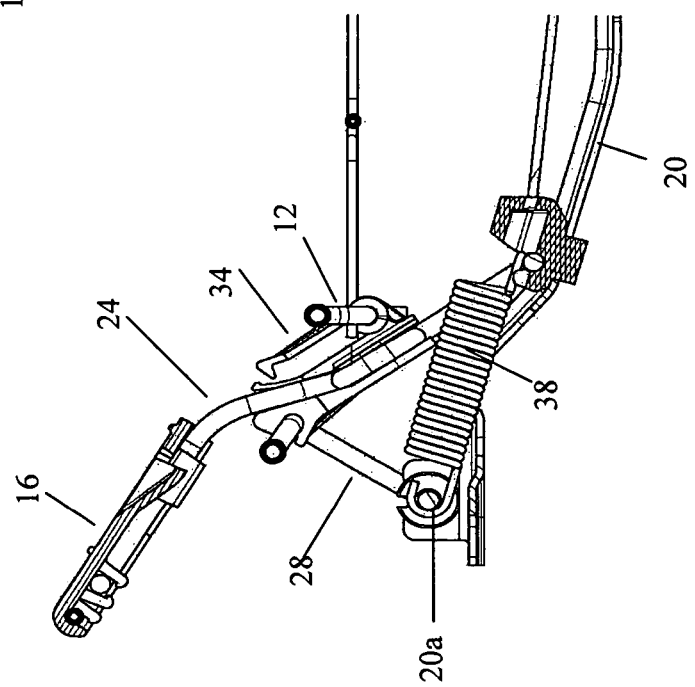

As shown in FIGS. 7–9, the mounting clip (34) may indirectly connect the support arm (24) to the bracket mount (20) and may also connect the support arm (24) to the side margins (12). Generally, the mounting clip (34) connects the support arm (24) to the mount (20) through a rotational connection to the hinge arm (28) where the second end of the hinge arm (28b) is pivotally attached to the end of the bracket (20). As illustrated in FIGS. 7 and 8, the hinge arm (28) can be connected to the bracket mount (20) through the second slide clip (32). As discussed above, the first and second pairs of slide clips (30, 32) are seated in their respective slots (22). Actuation of the Bowden cable (40) causes the slide clip (30) to slide in a direction within the guide, causing the hinge arm (28) to pivot in relation to the ergonomic support (16) as the ergonomic support is moved in a like manner. Alternatively, as illustrated in FIGS. 9A and 9B, the hinge arm (28) can be connected to the bracket mount (20) through a fixed pivot point (20a). With the fixed pivot point (20a), the coupling section (24b) of the support arm (24) is preferably in a sliding relationship with the mounting clip (34) between the support arm (24) and the side margin (12), and it will be appreciated that the mounting clip (34) either of these embodiments can connect the support arms (24) in sliding and rotation relationships with the side margin (12) and hinge arm (28), respectively.

As particularly illustrated in FIG. 9A the mounting clip (34) connects the support arm (24) in a sliding manner with respect to the side margin (12) and in a rotating manner with respect to the hinge arm (28). Accordingly, the mounting clip (34) includes integral attachment means for fixed, sliding and pivoting attachment. The coupling section of the support arm (24b) is fixedly attached to the mounting clip. The mounting clip (34) is slidingly and pivotally engaged with the side margin (12). The first end of the hinge arm (28a) is pivotally attached to the mounting clip. Upon actuation of the Bowden cable, the slide clip (30) moves in a direction within the slot (22) as the support arm is pulled inward and downward, thereby causing the side margins (12) to slide and the hinge arm (28) to pivot in relation to the bracket, thereby rotating the support between extended and retracted positions. It will be appreciated that the mounting clip (34) can provide the sliding cooperative relationship between the support arm (24) and the side margin (12) by being fixed to the side margin (12) and permitting the support arm (24) to slide.

As discussed above, a spring (38) can be used to force the ergonomic support from a retracted position to an extended position. In the particular embodiment shown in FIG. 9, a coil extension spring (38) biases the arms in their extended position, and tension on the Bowden cable is increased to retract the arms. The coil extension spring (38) extends between and is connected to the end of the bracket (20) and the slide clip (30). Actuation of the Bowden cable (40) causes the slide clips (30, 32) to slide toward the center of the bracket, increasing the tension of the spring (38). The increase in tension forcefully pulls the ergonomic support inward and downward as it moves from the extended position to the retracted position in the manner described above.

In the embodiments described above, the bolster support is described as the ergonomic support (16) that is rotated with the support arms (24). It will be appreciated that other types of ergonomic supports may also be operated by the rotating support arms according to the present invention, apart from any bolster or in combination therewith, such as the lumbar illustrated in FIGS. 10A and 10B and head restraint systems (not shown). Accordingly, depending on the type(s) of ergonomic support being actuated, the side margin may be horizontally and/or vertically situated within the seat. It will also be appreciated that a spring can force the ergonomic supports from a retracted position to an extended position.

Referring particularly to FIGS. 10A and 10B, the ergonomic support (16) is a lumbar (110) with a mount (112), a pair of arms (114, 116) rotatably connected to each other, a spring (118) connected between the pair of arms and the mount, and an actuator (120) operatively connected to the pair of arms and the mount. One of the arms serves as the lever arm (114) with one end (122) connected to the mount (112). The lever arm (114) is attached to the mount (112) in a rotating relationship (128) and a translating relationship (130) and extends from the connection end (122) through a coupling section (124) to a distal end (126). The other arm (116) supports the lever arm (114), preferably through a pivot (132) connected at the coupling section (124). Another pivot (134) rotatably connects the other end of the support arm (116) to the mount (112).

The spring (118) preferably biases the pair of arms (114, 116) into the extended position (136') illustrated in FIG. 10B, rotating the arms relative to each other and away from the mount (112). The actuator (120) operates against the spring's bias, rotating the arms (114, 116) back toward the mount to the retracted position (136") illustrated in FIG. 10A. Preferably, a slide clip (138) connects the lever arm (114) to the mount (112). The slide clip (138) translates relative to the mount (112) with the lever arm's base end (122) rotatably attached to the slide clip (138). A pivot clip (140) can be used to rotatably connect the lever arm (114) with the support arm (116), and the support arm (116) can be rotatably connected to the mount through a sleeve (142).

It will be appreciated that the support (110) can be indirectly connected to the seat frame or directly attached to the seat frame. Preferably, the support (110) is connected to the seat frame through a mounting assembly that includes a support wire (144) and a bracket (146). It will also be appreciated that the lever arm (114) could be connected to one bracket (146) while the support arm (116) is connected to another bracket (148). The brackets (146, 148) are preferably integrally formed as a single bracket mount (112), but may also be attached directly to each other or indirectly connected to each other, such as through support wire (144). In the preferred embodiment, the slide clip (138) translates relative to the mount (112) within a slot (150) formed in the lever arm bracket (146) and the arms (114, 116) are each made from a wire formation (152).

The spring (118) can be any type of spring system, including multiple coil extension springs (154) illustrated in FIGS. 10A and 10B although it will be appreciated that a single coil extension spring (154) could be used, as well as any equivalent device which uses elastic deformation to provide the biasing force against which the actuation system operates. It will also be appreciated that certain springs may be better suited depending on their position relative to the mount (112) and the support (110). For example, as discussed above, a torsional or spiral spring may be better situated between the ergonomic support (16) and the side margin (12) to bias the ergonomic support in the extended position. Similarly, for the lumbar support (110), a torsional spring could be situated between mount and the support arm (not shown).

The biasing of the spring (118) generally forces a translation (156) of the lever arm (114) relative to the support arm (116), and the actuator (120) forces an opposite translation (158). As discussed above, in the preferred embodiment, the spring-forced translation (156) causes the arms (114, 116) to rotate away from the mount (112), thereby extending the support (110), and the actuator-forced translation causes the arms (114, 116) to rotate toward the mount (112), thereby retracting the support (110).

As discussed above, the slide clip (30, 32, 138) and slot (22, 150) generally exemplify any type of track slide system that can be used to slidingly connect the lever arm (114) to its bracket (146). Generally, as a runner slide system, the slide clip serves as the slide element (138) and the slot serves as the runner element (150). Other types of runner slide systems may also be used, including those that are generally known and that come to be developed in the future. For example, it is within the scope of the present invention to replace the slide clip and slot with the following known runner slide combinations: a track/rod and slide block arrangement, a pair of intermeshing tracks, and a threaded rod and translating block as respectively described in U.S. Pat. No. 5,397,164, GB 2013487, and U.S. Pat. No. 3,241,879. Therefore, it will be appreciated that any known slide means—guide or runner, threaded or intermeshing—can be used within the scope of the present invention. It will also be appreciated that a rod may serve as both the mount and the runner when a block slides thereon.

Many types of actuators can be used to rotate the arms (114, 16) back toward the bracket mount (112). One type of actuator is a bowden cable (160) which has a sheath (162) surrounding an inner wire core (164) that can slide within the sheath (162). The actuator can be operated by a manual device, such as a hand wheel or lever, or by a powered device, such as an electric motor and gear assembly. Also, the actuator can be automatically operated by the folding of the seat in which the relative folding of the back and bottom operates the actuator. Accordingly, the retraction of the support can be controlled by an actuator that is manually operated, power operated, and/or automatically operated. The sleeve (162) is fixedly mounted to the bracket mount (112) or other some other fixed attachment and the wire core (164) is connected to the lever arm (114). It will be appreciated that the wire core (164) may be attached directly to the lever arm (114) or connected through the slide clip (138). To operate the bowden cable (160), the wire core (164) is pulled relative to the sleeve (162), and the operative force is transferred to the support arms (114, 116) through their connection to the wire (164).

In view of the foregoing, it will be seen that the several advantages of the invention are achieved and attained. For example, the present invention increases the commonality of the parts between different types of ergonomic supports. In particular, many of the same features of the present invention are shown to be used for the bolster device as well as the lumbar device.

The embodiments explain the principles of the invention and its practical application to thereby enable others skilled in the art to best utilize the invention in various embodiments and with various modifications as are suited to the particular use contemplated. As various modifications could be made in the constructions and methods herein described and illustrated without departing from the scope of the invention, it is intended that all matter contained in the foregoing description or shown in the accompanying drawings are illustrative rather than limiting. Thus, the breadth and scope of the present invention should not be limited by any of the exemplary embodiments, but should be defined in accordance with the following claims and equivalents.

What is claimed is:

1. A support system for a seat, comprising:
   an ergonomic support;
   a mount having a runner extending from a first end to a second end, said runner comprising a slot in a bracket;
   a slide operatively engaging said runner, wherein said slide moves between said first end and said second end of said runner, said slide comprising a slide clip seated in said slot;
   a support arm having a first end connected to said slide, a second end engaging said ergonomic support and a coupling portion located between said first end and said second end;
   a mounting clip securing said coupling portion of said support arm relative to said mount and permitting said first end and said second end of said support arm to rotate relative to said coupling portion of said support arm as said slide moves between said first end and said second end of said runner; and
   an actuator operatively connected to said slide, wherein operation of said actuator causes said slide to move between said first end and said second end of said runner.

2. A support system as set forth in claim 1, wherein said support arm is comprised of a wire formation.

3. A support system as set forth in claim 1, wherein said clip is a guide clip fixedly connected to said mount, said guide clip comprising at least one channel surrounding said coupling portion of said support arm, wherein said support arm slides and rotates relative to said channel as said slide is moved.

4. A support system as set forth in claim 1, wherein said mounting clip is secured to said coupling portion of said support arm at a position approximately equidistant between said first end and said second end of said support arm.

5. A support system as set forth in claim 1, wherein said ergonomic support is selected from the group of supports consisting of a lumbar, a bolster, a pair of bolsters, and a combination thereof.

6. A support system as set forth in claim 5, further comprising a pair of side margin wires and a plurality of transverse wires connected therebetween, said side margin wires being connected to said ergonomic support through at least one of said mounting clip and said mount.

7. A support system as set forth in claim 6, wherein said ergonomic support is at least one bolster proximate to one of said side margin wires and wherein said support arm is operatively connected to said side margin wire.

8. A support system as set forth in claim 7, wherein said support arm is connected to said side margin wire through said mounting clip.

9. A support system as set forth in claim 1, wherein said actuator comprises a Bowden cable.

10. A support system as set forth in claim 1, further comprising a hinge arm connected between said ergonomic support and said mount.

11. A support system as set forth in claim 10, wherein said mounting clip is connected to said mount through said hinge arm and wherein said hinge arm is connected to said ergonomic support through said mounting clip.

12. A support system as set forth in claim 10, wherein said mounting clip is connected to said mount through said hinge arm.

13. A support system as set forth in claim 10, wherein said hinge arm is connected to said ergonomic support through said mounting clip.

14. A support system as set forth in claim 1, further comprising a spring operatively connected between said ergonomic support and said mount.

15. A support system as set forth in claim 14, wherein said spring is connected to said ergonomic support through said support arm.

16. A support system for a seat, comprising:
an ergonomic support;
a mount having a runner extending from a first end to a second end;
a slide operatively engaging said runner, wherein said slide moves between said first end and said second end of said runner;
a support arm having a first end connected to said slide, a second end engaging said ergonomic support and a coupling portion located between said first end and said second end;
a mounting clip securing said coupling portion of said support arm relative to said mount and permitting said first end and said second end of said support arm to rotate relative to said coupling portion of said support arm as said slide moves between said first end and said second end of said runner; and
an actuator comprising a Bowden cable and operatively connected to said slide through said Bowden cable, wherein operation of said actuator causes said slide to move between said first end and said second end of said runner.

17. A support system for a seat, comprising:
an ergonomic support;
a mount having a runner extending from a first end to a second end;
a spring operatively connected between said ergonomic support and said mount;
a slide operatively engaging said runner, wherein said slide moves between said first end and said second end of said runner;
a support arm having a first end connected to said slide, a second end engaging said ergonomic support and a coupling portion located between said first end and said second end;
a mounting clip securing said coupling portion of said support arm relative to said mount and permitting said first end and said second end of said support arm to rotate relative to said coupling portion of said support arm as said slide moves between said first end and said second end of said runner, wherein said mounting clip is secured to said coupling portion of said support arm at a position approximately equidistant between said first end and said second end of said support arm; and
an actuator operatively connected to said slide, wherein operation of said actuator causes said slide to move between said first end and said second end of said runner.

18. A support system as set forth in claim 17, further comprising a hinge arm connected between said ergonomic support and said mount.

19. A support system as set forth in claim 17, wherein said runner is a slot in a bracket and said slide is a slide clip seated in said slot.

20. A support system for a seat, comprising:
an ergonomic support;
a bracket having a slot extending from a first end to a second end;
a slide clip seated in said slot, wherein said slide clip moves between said first end and said second end of said slot;
a support arm having a first end connected to said slide clip, a second end engaging said ergonomic support and a coupling portion located between said first end and said second end, wherein said support arm is comprised of a wire formation;
a mounting clip securing said coupling portion of said support arm relative to said bracket and permitting said first end and said second end of said support arm to rotate relative to said coupling portion of said support arm as said slide clip moves between said first end and said second end of said slot, wherein said mounting clip is secured to said coupling portion of said support arm at a position approximately equidistant between said first end and said second end of said support arm;
a hinge arm connecting said ergonomic support to said bracket, wherein said mounting clip is connected to said bracket through said hinge arm and wherein said hinge arm is connected to said ergonomic support through said mounting clip; and
an actuator operatively connected to said slide clip, wherein operation of said actuator causes said slide clip to move between said first end and said second end of said slot.

21. A support system as set forth in claim 20, further comprising a spring operatively connected between said ergonomic support and said bracket, wherein said hinge arm is slidingly connected to said bracket.

22. A support system as set forth in claim 20, further comprising a spring operatively connected between said ergonomic support and said bracket, wherein said hinge arm is pivotally connected to said bracket.

23. A support system for a seat, comprising:
an ergonomic support;
a bracket having a slot extending from a first end to a second end;
a slide clip seated in said slot, wherein said slide clip moves between said first end and said second end of said slot;
a support arm having a first end connected to said slide clip, a second end engaging said ergonomic support and a coupling portion located between said first end and said second end, wherein said support arm is comprised of a wire formation;
a guide clip fixedly connected to said bracket, said guide clip comprising at least one channel surrounding said coupling portion of said support arm, wherein said support arm slides and rotates relative to said channel as said slide clip is moved, wherein said guide clip is secured to said coupling portion of said support arm at a position approximately equidistant between said first end and said second end of said support arm; and
an actuator operatively connected to said slide clip, wherein operation of said actuator causes said slide clip to move between said first end and said second end of said slot.

24. A support system as set forth in claim 23, further comprising a spring operatively connected between said ergonomic support and said bracket.

25. A support system as set forth in claim 23, further comprising a pair of side margin wires and a plurality of transverse wires connected therebetween, said side margin wires being connected to said ergonomic support through a mounting clip.

26. A support system as set forth in claim 25, wherein said ergonomic support is at least one bolster proximate to one of said side margin wires and wherein said support arm is operatively connected to said side margin wire.

* * * * *